(12) United States Patent
Mentink

(10) Patent No.: US 8,173,945 B2
(45) Date of Patent: May 8, 2012

(54) APPARATUS AND METHOD FOR GUIDANCE OF A PROJECTILE

(75) Inventor: Henk Mentink, Lk Hengelo (NL)

(73) Assignee: Thales Nederland B.V., Hengelo (NL)

( * ) Notice: Subject to any disclaimer, the term of this patent is extended or adjusted under 35 U.S.C. 154(b) by 454 days.

(21) Appl. No.: 12/281,047

(22) PCT Filed: Mar. 1, 2007

(86) PCT No.: PCT/EP2007/051963
§ 371 (c)(1),
(2), (4) Date: May 21, 2009

(87) PCT Pub. No.: WO2007/099150
PCT Pub. Date: Sep. 7, 2007

(65) Prior Publication Data
US 2010/0032514 A1     Feb. 11, 2010

(30) Foreign Application Priority Data
Mar. 3, 2006  (NL) .................................... 1031288

(51) Int. Cl.
*F41G 7/24* (2006.01)
*F41G 7/00* (2006.01)

(52) U.S. Cl. ...... 244/3.13; 244/3.1; 244/3.11; 244/3.14; 342/61; 342/62

(58) Field of Classification Search .......... 244/3.1–3.19; 343/700 R, 705; 89/37.01, 41.01, 41.02, 89/41.06, 41.07; 342/61–68, 74–81, 147–155, 342/175
See application file for complete search history.

(56) References Cited

U.S. PATENT DOCUMENTS

| | | | | |
|---|---|---|---|---|
| 2,826,378 A * | 3/1958 | Childs, Jr. | | 244/3.13 |
| 3,782,667 A * | 1/1974 | Miller et al. | | 244/3.13 |
| 4,006,356 A * | 2/1977 | Johnson et al. | | 244/3.16 |
| 4,020,339 A * | 4/1977 | Gustafson | | 244/3.13 |
| 4,021,007 A * | 5/1977 | Coxe | | 244/3.13 |
| 4,034,949 A * | 7/1977 | Hoesterey et al. | | 244/3.16 |
| 4,174,818 A * | 11/1979 | Glenn | | 244/3.13 |
| 4,299,360 A * | 11/1981 | Layton | | 244/3.13 |
| 4,300,736 A * | 11/1981 | Miles | | 244/3.13 |
| 4,397,429 A * | 8/1983 | Fouilloy | | 244/3.11 |
| 4,406,430 A * | 9/1983 | Krammer et al. | | 244/3.13 |
| 4,424,944 A * | 1/1984 | Wes et al. | | 244/3.13 |
| 4,429,312 A | 1/1984 | Chisholm | | |
| 4,501,399 A | 2/1985 | Loomis, III | | |
| 4,516,743 A * | 5/1985 | Sweeney et al. | | 244/3.13 |
| 4,562,769 A * | 1/1986 | Heynau et al. | | 89/41.06 |

(Continued)

FOREIGN PATENT DOCUMENTS
DE     3341186     6/1984
(Continued)

*Primary Examiner* — Bernarr Gregory
(74) *Attorney, Agent, or Firm* — Stroock & Stroock & Lavan LLP

(57) ABSTRACT

There is disclosed an apparatus and a method for guidance of a projectile. The method for guidance of a projectile, includes emission from the launching position of the projectile of beams pointing to the vertexes of a regular polygon, emission from the launching position of a beam encompassing the preceding beams, determination of position of the projectile relative to the beams, the determined position enabling to correct the projectile trajectory to maintain the projectile the closer to the center of the polygon formed by the beams.

9 Claims, 4 Drawing Sheets

U.S. PATENT DOCUMENTS

| | | | | |
|---|---|---|---|---|
| 4,732,349 A | * | 3/1988 | Maurer | 244/3.13 |
| 5,344,099 A | | 9/1994 | Pittman et al. | |
| 5,374,009 A | * | 12/1994 | Miller et al. | 244/3.13 |
| 5,601,255 A | * | 2/1997 | Romer et al. | 244/3.13 |
| 5,664,741 A | | 9/1997 | Duke | |
| 5,831,571 A | | 11/1998 | Rickett et al. | |
| 6,313,784 B1 | * | 11/2001 | Pittman et al. | 244/3.13 |
| 6,568,627 B1 | | 5/2003 | Jones et al. | |
| 6,768,465 B2 | * | 7/2004 | Stewart, II | 343/705 |

FOREIGN PATENT DOCUMENTS

| | | |
|---|---|---|
| DE | 4416211 A1 | 11/1995 |
| DE | 3624339 | 7/2003 |
| EP | 0234030 A1 | 9/1987 |
| FR | 2748881 A | 11/1997 |
| WO | WO-97/28416 | 8/1997 |

\* cited by examiner

APPARATUS AND METHOD FOR GUIDANCE OF A PROJECTILE

CROSS-REFERENCE TO RELATED APPLICATIONS

This application is the U.S. national stage application of, and claims priority from, International Application No. PCT/EP2007/051963, filed Mar. 1, 2007, which in turn claims priority from Netherlands patent application No. 1031288 filed with the Netherlands Patent Office on Mar. 3, 2006, both of which are incorporated herein by reference in their entirety.

FIELD OF THE INVENTION

The present invention relates to an apparatus and a method for guidance of a projectile. It is applicable to guidance of ammunition to targets.

BACKGROUND OF THE INVENTION

Beam riding missiles are guided to a target by following a beam pattern emitted from the launch pad and aiming at the target or at an estimated position of the target in the future. "Line of Sight" is the method by which a missile is guided to current position of the target. "Line of Command" is the method by which a missile is guided to an estimated position of the target in the future. The beam pattern can be made of as many beams as necessary. Often, data is encoded in some of the beams to communicate with airborne systems onboard the missile. Such a method involves the use of facilities to detect and track the target.

Monopulse clusters are used to detect and track the target and guide the missile using the same facilities alternately. Monopulse cluster is a well-known means to emit single frequency electromagnetic beams in different directions. It is based on waveguide technology. Range of frequency depends on the size of the waveguides making up the monopulse cluster. Directions of emission depend on the construction of the emission horn in combination with the parabola reflector. In a single antenna it is possible to alternately detect target and guide missile at a relatively low cost. The square-shaped beam position pattern resulting from the squared structure of 4 waveguides merged within an emission horn is used to guide missiles, assuming the missile is illuminated by at least some beams anywhere within the square.

Unfortunately, due to physical limitations, ends of waveguides merged within the horn of a cluster seldom generate beams that overlap correctly. As a consequence, a shadow zone in which the missile receives no beam at all may exist and in which estimation of a relative position of the missile is not possible. The shadow zone is located in the vicinity of the centre of the square, where deviation is minimum. The worst is that missile may miss control data encoded in one of the beams, preventing airborne control system onboard the missile from full operation.

Indeed, it is rather difficult to manufacture a four-output horn generating small angular distance between the four beams. The 4 beams generated are more separated than required for guidance. Using dielectric material instead of air within the waveguides, the spacing between the waveguides can be reduced. But resulting clusters are far more expensive and antennas are difficult to tune.

SUMMARY OF THE INVENTION

The present invention aims to provide an apparatus and a method that may be used to deal with a possible shadow zone in which the beams of the guidance pattern do not illuminate the missile well enough.

A first embodiment of the present invention may provide an apparatus for guidance of a projectile, wherein beams are emitted using a monopulse cluster having 4 waveguides, each waveguide being used alternately to emit 4 beams pointing to the vertexes of a square, the 4 waveguides being used simultaneously to emit a beam encompassing the 4 preceding beams. It is to be understood that the apparatus described above may embody a method for guidance of a projectile.

Accordingly, a second embodiment of the present invention may provide a method for guidance of a projectile, including emission from the launching position of the projectile of position steering beams pointing to the vertexes of a regular polygon, including emission from the launching position of an additional beam encompassing the preceding beams. Allowing determination of position of the projectile relative to the beams, the determined position enables to correct the projectile trajectory to maintain the projectile the closer to the centre of the polygon formed by the beams.

Preferably, the encompassing beam may be a summation of beams forming the polygon.

For example, the regular polygon may be a square.

In a mode of implementation, the beams may be emitted alternately towards the target.

Preferably, determination of relative position of projectile in the trajectory towards the target may be performed onboard the projectile by an interpolation method from strength measurement of each beam received by projectile.

Each of the beams forming the regular polygon may be encoded, time sequenced or modulated, so as to be easily recognisable onboard the projectile and the encompassing beam may be used to send control data that must not be lost. This encompassing beam can be used for interpolation in case beams are lost earlier in the sequence.

The U.S. Pat. No. 5,344,099 discloses a method of guiding a missile by means of a radar, the radar emitting four parallel beams conveying data to the missile. However, the U.S. Pat. No. 5,344,099 does not disclose the use an additional beam which encompasses the four parallel beams. A disadvantage of the solution disclosed in this patent is that the missile may miss data when it flies in the shadow zone located in between the beams.

Thus, an advantage provided by the present invention in any of its aspects is that it does not require major modifications of most existing guidance systems based on beam riding principle. Indeed, in the case of systems equipped with the well-known 4-waveguides monopulse cluster as an emitter, only the switching system is possibly to be added or modified to enable the 4 waveguides to emit simultaneously so as to form the encompassing beam as the sum of 4 beams. In the case of systems equipped with an electronic sweeping antenna that would have to launch projectiles guidable only with a beam pattern according to the invention, the encompassing beam could easily be formed after simple upgrade of beam steering and forming program.

Furthermore, any embodiment of the invention can be based on standard interpolation methods to take advantage of the encompassing beam. Therefore, the invention does not involve supplementary computing capacity.

BRIEF DESCRIPTION OF THE DRAWINGS

Non-limiting examples of the invention are described below with reference to the accompanying drawings in which.

In the figures, like reference signs are assigned to like items.

DETAILED DESCRIPTION OF THE PREFERRED EMBODIMENTS

Figure 1:
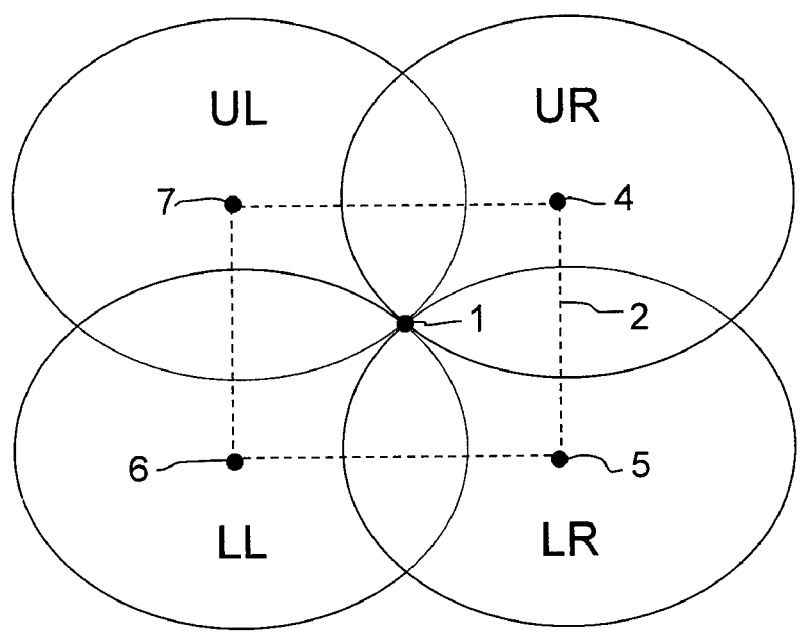
FIG. 1 schematically illustrates the ideal beam pattern that should be obtained from the use of a 4-waveguides cluster without defect according to prior art.

FIG. 1 schematically illustrates the ideal beam pattern that should be obtained from the use of a 4-waveguides cluster without defect according to prior art. Circular or elliptical zones UL, LL, LR and UR depict areas of space in which missile can be illuminated by each of the 4 beams emitted by the 4-waveguides cluster without defect. UL states for Upper Left, LL states for Lower Left, LR states for Lower Right and UR states for Upper Right. In the description below, each beam is quoted similarly to the zone it illuminates, that is to say beam UL, beam LL, beam LR and beam UR. The squared structure of the 4 waveguides merged within the emission horn of the monopulse cluster without defect generates a square-shaped beam position pattern, which is represented by a square 2. Vertexes 4, 5, 6 and 7 of the said square 2 are the centres of elliptical zones UL, LL, LR and UR. A position 1 represents the centre of the said square 2. It is to be noticed that there is no shadow zone in the beam pattern as generated by the 4-waveguides monopulse cluster without defect and that the position 1 is the only position where the missile is illuminated by the 4 beams UL, LL, LR and UR. Wherever the missile locates in the pattern, it has to receive at least some of the 4 beams to allow interpolation of the relative position.

For example, considering the method "Line of Sight", the missile is launched in the direction of position 1, which is a precise direction to the target. As soon as launching, beams UL, LL, LR and UR are alternately emitted, each beam pointing to one of the vertexes 4, 5, 6 or 7 of the square 2 whose centre is the position 1. As a consequence, centre of the square is both the line of sight to the missile and the line of sight to the target. Upon receipt of the beams by receiver onboard the missile, airborne systems compute position of the missile relative to the 4 beams UL, LL, LR and UR by an interpolation method based on strength of each beam received. If estimated position is not close enough to the centre 1 of the square 2, say not close enough to the line of sight to the target, missile may correct its trajectory.

But manufacturing a 4-waveguides monopulse cluster without defect that generates an ideal beam pattern is difficult. As focused in FIG. 2, actual 4-waveguides monopulse clusters may often generate a shadow zone in which the missile is not illuminated well enough and in which the missile can neither correct its trajectory nor receive data with enough confidence.

Figure 2:
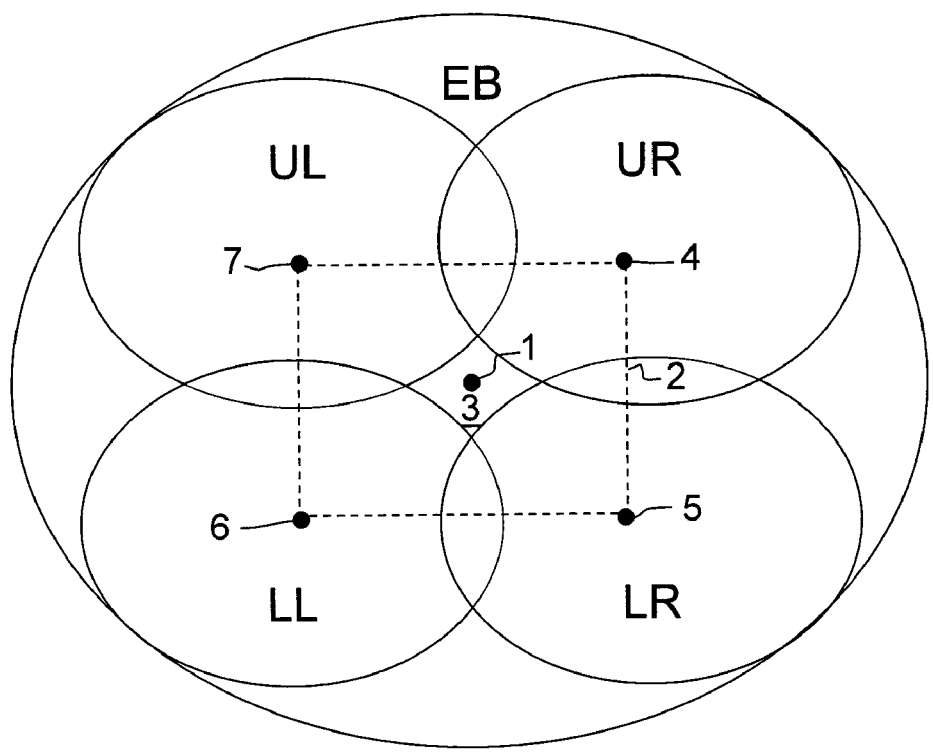
FIG. 2, schematically illustrates the beam pattern that is obtained from the use of an actual 4-waveguides cluster according to an embodiment of the invention.

FIG. 2 schematically illustrates the beam pattern that is obtained from the use of an actual 4-waveguides monopulse cluster according to the invention. A shadow zone 3 in which the missile is not illuminated enough by any of the beams UL, LL, LR and UR appears in the vicinity of the centre 1 of the square 2. It is due to physical limitations of monopulse cluster. In this area of space, the missile cannot correct its trajectory nor receive data. To enable the missile to correct its trajectory or to receive reliable data even when it is located in zone 3, embodiments of the invention propose to emit a summation of the 4 beams UL, LL, LR and UR. The resulting beam EB encompasses beam UL, LL, LR and UR and covers the shadow zone 3. In case of low strength measurement of some of the beams UL, LL, LR or UR, measurement of beam EB can be used anyway to estimate position of missile. Beam EB can always be used to send data to the missile, ensuring data is never lost.

It is to be understood that variations to the examples described herein, such as would be apparent to a person of ordinary skill in the art, may be made without departing from the scope of the present invention.

FIGS. 3a, 3b, 3c, 3d, 3e and 3f schematically illustrate an example of antenna that works according to an embodiment of the invention. It can be integrated into a launching pad for guidance of missiles. Preferably, a square-shaped pattern is implemented by use of a standard 4-waveguide monopulse cluster forming a horn 30. It is fed power through a switching system 32. The horn 30 is arranged to face a reflection dish 31. Each waveguide merged within the horn 30 is quoted similarly to the beam it generates, that is to say waveguide UL, waveguide LL, waveguide LR and waveguide UR. The switching system 32 enables easy selection of a single waveguide for beam emission by supplying power only to appropriate connection, each waveguide being associated to a connection. Each connection is quoted similarly to the waveguide it supplies, that is to say connection UL, connection LL, connection LR and connection UR. Preferably, connections are switched on alternately and beams are emitted towards the target.

Figure 3C:
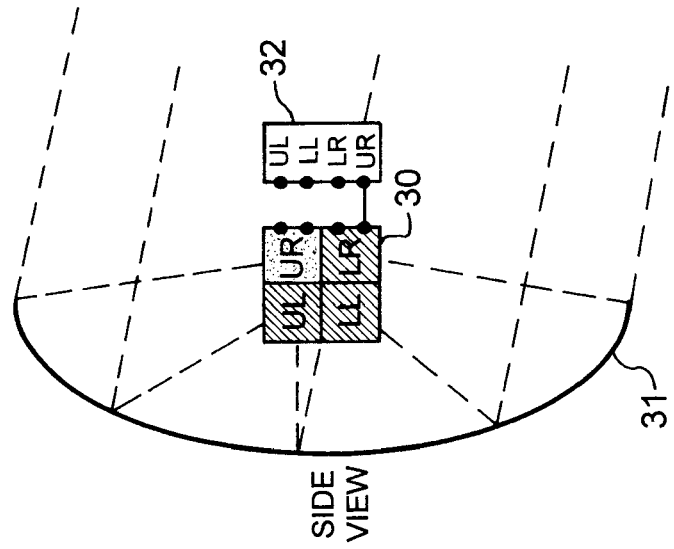
FIGS. 3a, 3b, 3c, 3d, 3e and 3f schematically illustrate an example of an antenna according to an embodiment of the invention.
Figure 3B:
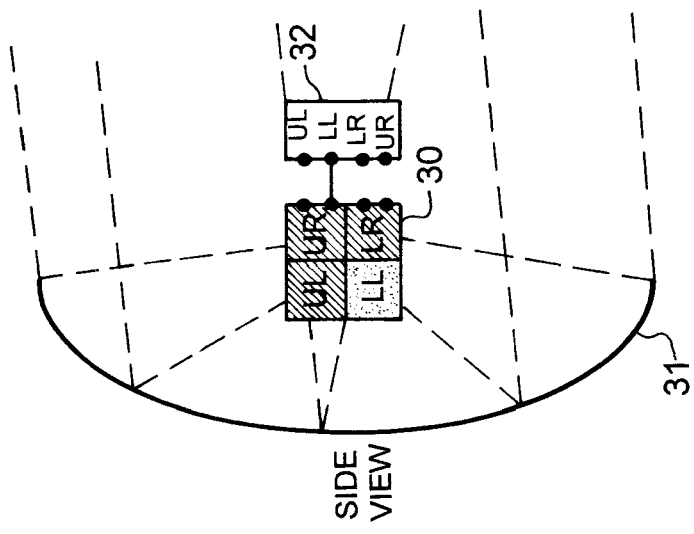
Figure 3A:
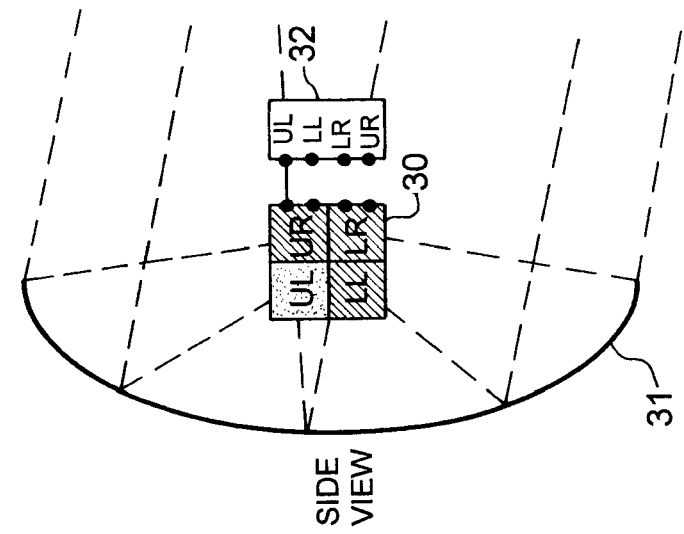

FIG. 3a focuses by a side view on emission of the beam UL. In a first step for example, the switching system 32 is set to supply radio-frequency power only to connection UL. The beam UL reflects on the whole surface of the dish 31 and illuminates the zone UL described above. Preferably, for easy recognition of beam UL by receiver onboard the missile, beam UL is encoded.

FIG. 3b focuses by a side view on emission of the beam LL. In a second step for example, the switching system 32 is set to supply power only to connection LL. The beam LL reflects on the whole surface of the dish 31 and it illuminates the zone LL described above. Preferably, for easy recognition of beam LL by receiver onboard the missile, beam LL is encoded.

FIG. 3c focuses by a side view on emission of the beam UR. In a third step for example, the switching system 32 is set to supply power only to connection UR. The beam UR reflects on the whole surface of the dish 31 and it illuminates the zone UR described above. Preferably, for easy recognition of beam UR by receiver onboard the missile, beam UR is encoded.

Figure 3F:
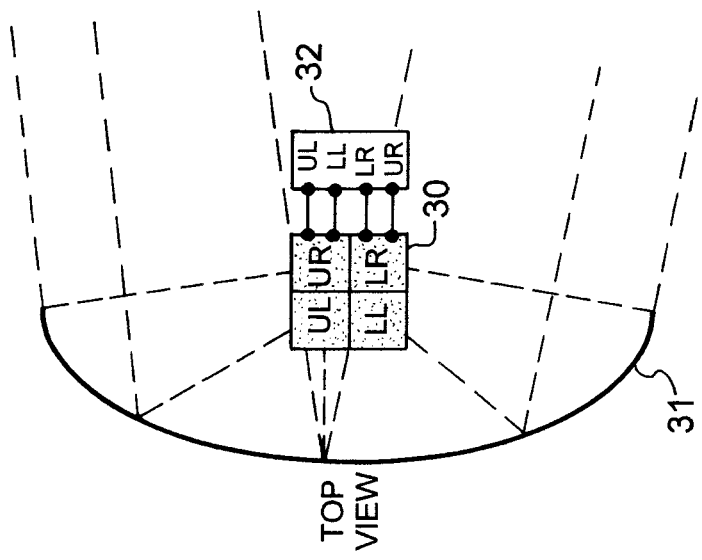
Figure 3E:
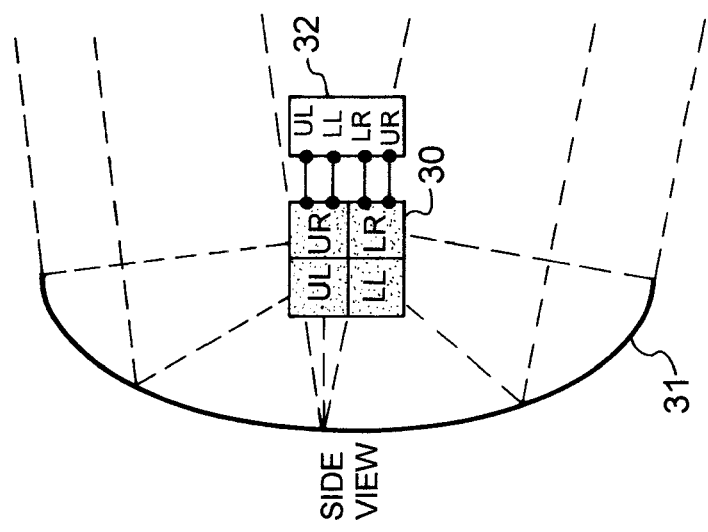
Figure 3D:
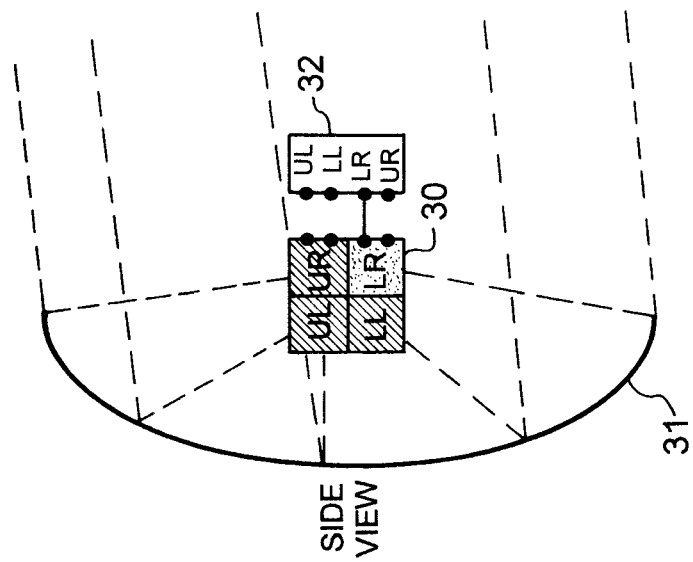

FIG. 3d focuses by a side view on emission of the beam LR. In a forth step for example, the switching system 32 is set to supply power only to connection LR. The beam LR reflects on the whole surface of the dish 31 and illuminates the zone LR described above. Preferably, for easy recognition of beam LR by receiver onboard the missile, beam LR is encoded.

It is to be noticed that beams UL, LL, UR and LR reflect on the dish 31 with different angles, both horizontally and vertically. That is the reason why they illuminate different zones.

Preferably, knowing relative position of each of the 4 beams and having measured their strength, airborne system onboard the missile estimates location of missile within the beam pattern by a standard interpolation method. Should the missile not be close enough to the hypothetical point of intersection 1 described above, a navigation system onboard the missile could correct its trajectory. But possibly, some of the beams are received with low strength, especially if the missile flies in the shadow zone 3 described above, not allowing precise interpolation. In this case, the encompassing beam EB according to the invention is to be used.

FIGS. 3e and 3f focus on emission of the encompassing beam EB, FIG. 3e by a side view and FIG. 3f by a top view. Preferably, encompassing beam EB may be summation of beams UL, LL, LR, and UR. In a fifth step for example, the switching system 32 is set to supply radio-frequency power to all connections UL, LL, LR and UR so as to emit the beams UL, LL, LR and UR simultaneously. The beam that is summation of beams UL, LL, LR and UR reflects on the whole surface of the dish 31. As a consequence, it encompasses the beams UL, LL, LR and UR. The encompassing beam EB is sure to be received by missile with workable strength, that is the reason why it may preferably be used to convey any kind of safe data that must not be lost. Anyway, the missile may measure the strength of beam EB for possible use in interpolation method instead of beam UL, LL, LR or UR that may have been previously measured too low.

Most of the switching systems already operating on antennas allow easy supply of power to the 4 waveguides in the same time without major modification.

It is to be understood that variations to the examples described herein, such as would be apparent to the skilled addressee, may be made without departing from the scope of the present invention.

Figure 4:
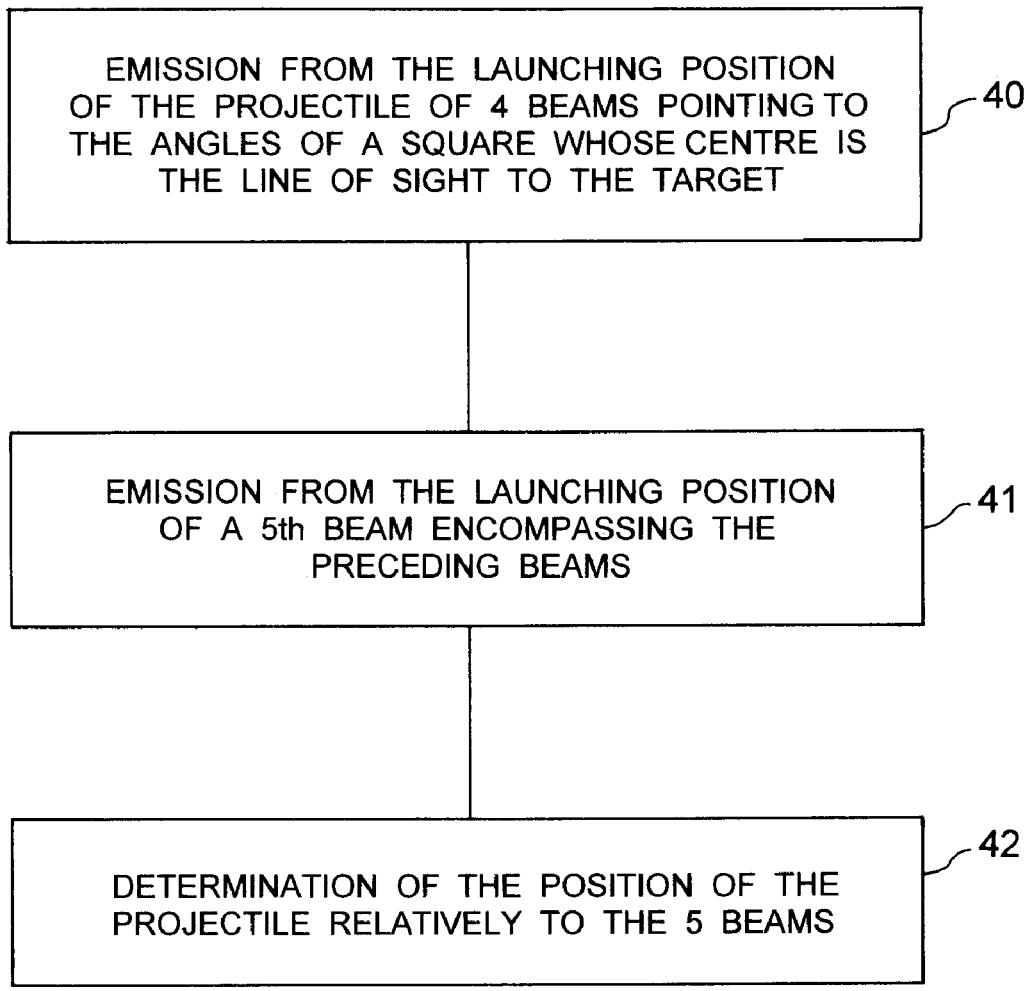
FIG. 4, schematically illustrates the possible phases of the method for guidance of a projectile according to an embodiment of the invention.

FIG. 4, schematically illustrates the possible phases of the method for guidance of a projectile according to the invention.

The method includes a first phase 40 of emission from the launching position of the projectile of 4 beams pointing to the vertexes of a square whose centre is the line of sight to the target. But it is to be understood that the number of beams that make up the pattern can vary, as long as the centres of the zones illuminated by the beams form vertexes of a regular polygon whose centre is the line of sight to the projectile. It means that the beam pattern may be a triangle, a square, a pentagon, a hexagon, and so on. Also, the beams may be simultaneously or alternately emitted, depending on emission/reception facilities, without departing from the scope of the invention.

The method includes a second phase 41 of emission from the launching position of a 5$^{th}$ beam encompassing the preceding beams. In the same way, the encompassing beam may be a 6$^{th}$ beam in the case of a pentagonal beam pattern or a 7$^{th}$ beam in the case of a hexagonal beam pattern, as long as it avoids having a shadow zone in the middle of the beam pattern.

The method includes a third phase 42 of determination of the position of the projectile relative to the 5 beams. As well, determination of the position of the projectile may be relative to more or fewer than 5 beams, depending on the beam pattern or on the monopulse tracking. Recognition criteria of each beam and interpolation method may also change without departing from the scope of the invention.

The invention claimed is:

1. A method for guidance of a projectile, including:
   emitting from a launching position of the projectile, a plurality of beams each pointing to a vertex of a regular polygon;
   emitting an additional beam from the launching position, the additional beam encompassing the plurality of beams and conveying data to the projectile;
   determining a position of the projectile relative to the plurality of beams and the additional beam, the determined position enabling the correction of a projectile trajectory with reference to the center of the regular polygon formed by the beams.

2. The method of claim 1, wherein the additional beam comprises a summation of the plurality of beams forming the regular polygon.

3. The method of claim 1, wherein the regular polygon is a square.

4. The method of claim 1, wherein the plurality of beams and the additional beam are emitted alternately.

5. The method of claim 1, wherein the plurality of beams and the additional beam are emitted towards the target.

6. The method of claim 1, wherein determination of relative position of the projectile is performed by an interpolation method from strength measurement of each beam received by the projectile.

7. The method of claim 6, wherein determination of relative position of the projectile is performed onboard the projectile.

8. The method of claim 7, wherein each of the plurality of beams forming the regular polygon is encoded so as to be recognizable onboard the projectile.

9. An apparatus for guidance of a projectile comprising:
   an emitter for emitting a plurality of beams each pointing to a vertex of a regular polygon, the emitter also emitting an additional beam encompassing the plurality of beams and conveying data to the projectile;
   a module for determining a position of the projectile relative to the plurality of beams and the additional beam, the determined position enabling the correction of a projectile trajectory with reference to the center of the regular polygon formed by the beams;
   wherein the plurality of beams and the additional beam are electromagnetic beams that are emitted using a monopulse cluster comprising four waveguides, each waveguide being used alternately to emit one of the plurality of beams pointing to the vertexes of a square, the four waveguides being used simultaneously to emit the beam encompassing the four beams.

* * * * *